June 21, 1960   R. D. CLEMSON   2,941,610
CONTROLLABLE DRIVE APPARATUS FOR ROTARY MOWERS
Filed July 10, 1956   7 Sheets-Sheet 2

INVENTOR:
RICHARD D. CLEMSON
BY
Curtis, Morris & Safford
ATTORNEYS

June 21, 1960 R. D. CLEMSON 2,941,610
CONTROLLABLE DRIVE APPARATUS FOR ROTARY MOWERS
Filed July 10, 1956 7 Sheets-Sheet 7

INVENTOR.
RICHARD D. CLEMSON.
BY
Curtis, Morris & Safford.
ATTORNEYS.

United States Patent Office 2,941,610
Patented June 21, 1960

2,941,610

CONTROLLABLE DRIVE APPARATUS FOR ROTARY MOWERS

Richard D. Clemson, Middletown, N.Y., assignor to Clemson Bros., Inc., Middletown, N.Y.

Filed July 10, 1956, Ser. No. 596,998

4 Claims. (Cl. 180—19)

The present invention relates to improved mowers and particularly to controllable wheel drive apparatus providing great ease in handling a rotary mower under all conditions of operation. This invention enables an operator to control a rotary mower with substantially no effort and in a relaxed and natural manner, advantageously enabling the operator to utilize his instinctive reflex actions in controlling the mower. The mower quickly responds to and automatically follows very light controlling forces applied upon the handle, and the engine supplies the motive power to drive the motor under sure, positive, and sensitive control from the handle.

There are certain power drives for lawn mowers which are commercially available, but many of these suffer from certain disadvantages. For example, they often involve two controls, such as for the clutch and throttle, and both of these controls are separate from the handle grips. These prior drives often have the annoying characteristic that they cause the mower to tend to "run away" from the operator. In reversing direction the operator literally must run around in a wide arc so as to remain behind the mower. When a rock or stump is seen in the mower's path the operator must quickly shift his hands away from the handle grips to reach the throttle and clutch controls. This operation of prior throttle and clutch controls requires a somewhat awkward response of the hands. These prior controls invite misoperation, with the result that the mower may crash into the obstruction before the operator has time to reach the clutch or throttle.

Among the many advantages of the improved rotary mowers described herein as illustrative embodiments of this invention are those resulting from the fact that the controllable drive apparatus provide an entirely natural "feel" to the person operating the mower. There is no requirement for the operator to shift his hands away from the handle grips to reach a separate throttle control and a clutch control. In these illustrative embodiments the entire control action is obtained from the handle; there is no requirement to remove the hands from the handle grips. Moreover, there is a complete absence of any tendency for the mower to "run away" from the operator. The mower automatically stops by causing a slight rearward motion of the handle with respect to the chassis of the mower.

In operation both hands rest lightly and naturally upon the handle. In fact, in easy terrain the mower can be very conveniently controlled by one hand. As the operator begins to walk forward, his hands permit the handle to move forward. The control apparatus immediately senses this slight change in forces and automatically begins to apply driving power to the wheels so as to advance the mower at the same speed as the operator is walking.

It is an advantage of the illustrative embodiments of the drive control apparatus described that they automatically pace the advance of the mower so as to maintain it at the same rate as the operator happens to be advancing. The mower does not tend to "run away" nor does it tend to lag. Instead, it advances easily and accurately in response to the slight guiding force exerted by the operator's hands as he walks at any desired pace behind the mower. The operator is enabled to walk at any rate he desires, and at any chosen speed the drive control apparatus advantageously frees the operator of the burden of pushing the mower.

If for any reason the operator sees that he must stop the mower, his natural reflex action in reducing the slight forward pressure on the handle instantaneously causes the mower drive apparatus to remove all power from the wheels. When the operator wishes to park the mower and leave it with the motor running, he effortlessly retracts the handle which disengages the drive control and leaves the mower in a neutral drive condition. In one embodiment the handle can readily be latched in retracted position; in the other embodiment the handle can be latched in an upright parking position.

Among the further advantages of the drive control apparatus described is the ease with which the height of cut can be adjusted quickly and conveniently without tipping the mower up or reaching under it. The rear drive wheels are readily shifted up or down on the mower frame by releasing a detent and swinging an adjusting arm in the desired direction.

In this specification and in the accompanying drawings, are described and shown illustrative embodiments of my invention and various modifications thereof are suggested, but it is to be understood that these are not intended to be exhaustive nor limiting of the invention, but on the contrary are given for purposes of illustration in order that others skilled in the art may fully understand the invention and the manner of applying the drive control apparatus in practical use on rotary mowers, so that they may modify and adapt it in various forms, each as may be best suited to the conditions of a particular use.

The various objects, aspects, and advantages of the present invention will be more fully understood from a consideration of the following specification in conjunction with the accompanying drawings in which:

Figure 3 is an enlarged detail sectional view of the controllable wheel driving clutch which is shown in Figure 2; Figure 3 is also taken on the line 3—3 of Figure 4 looking down;

Figure 1:
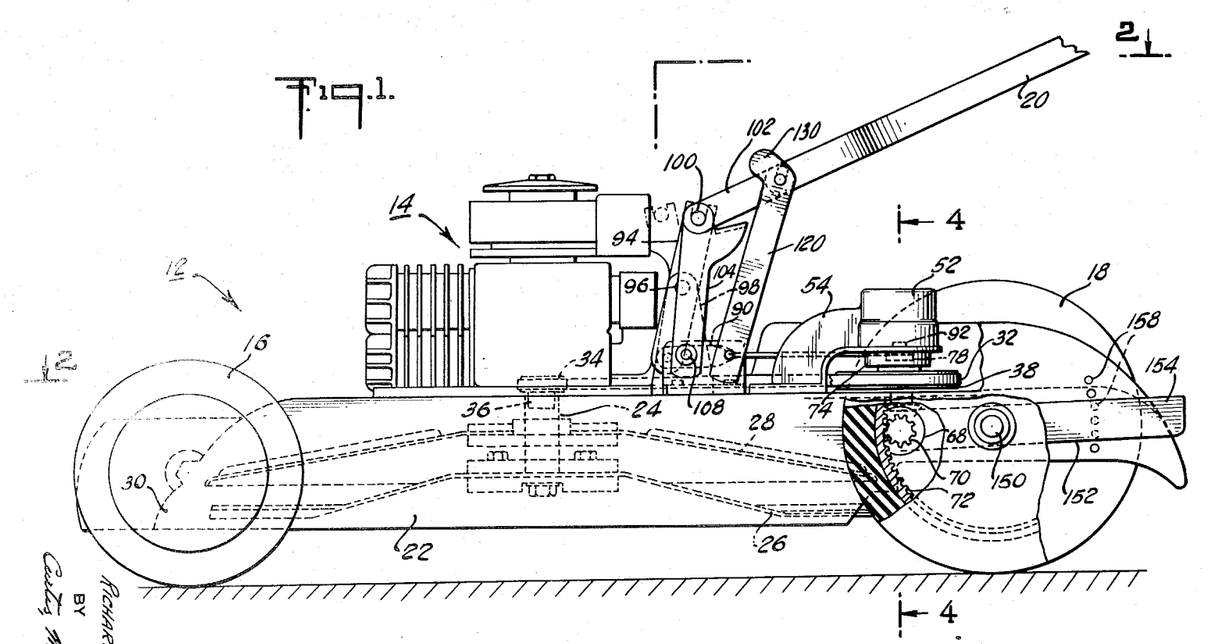
Figure 1 is an elevational view, partially in section and partially broken away, of an improved rotary mower embodying the present invention.
Figure 2:
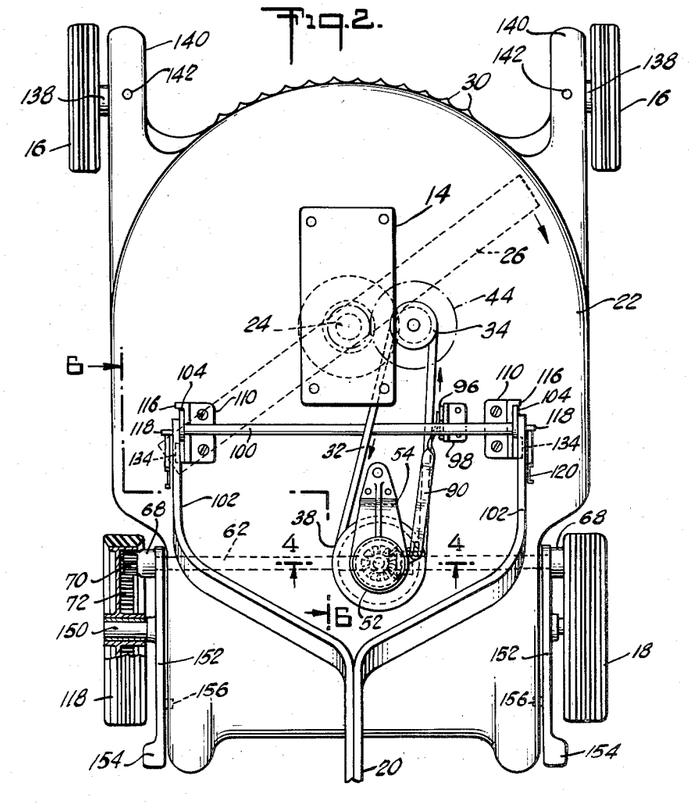
Figure 2 is a cross sectional view taken generally along the line 2—2 of Figure 1 looking down and showing the belt connection from a power take off shaft on the engine to a controllable wheel driving clutch.

As shown in Figures 1 and 2 the rotary mower includes a chassis frame, generally indicated at 12 having a suitable source of motive power 14 mounted thereon, here shown as a four cycle gasoline engine. The front wheels 16 are slightly smaller in diameter than the rear wheels 18 to which motive power is applied under the complete control of the handle 20. The chassis 12 includes a skirted housing 22 down into which projects an extension 24 of the engine crankshaft, shown in dotted outline as carrying a rotary cutting blade 26 with a rotary air impeller shield member 28, mounted on this shaft above the rotor. In a copending application Serial No. 504,406, filed on April 28, 1955, and assigned to the same assignee as the present application, is described and claimed the advantageous cutting and distribution action of such rotor blade and member assembly.

In operation the engine rotates the shaft 24 at high speed, and as the mower is advanced over the ground, the blades of grass enter the housing 22 between large guard teeth 30 projecting down from the front of the skirt. The rotor blade 26 neatly cuts off the grass and the cuttings are distributed down among the grass roots, as described in detail in said copending application.

In order to provide motive power for the rear wheels, a V-belt 32 runs around a drive pulley 34 mounted on an extension 36 of the cam shaft of the engine and runs back around a driven pulley 38 (see also Figures 4 and 6) carried by a sleeve bearing 40 journaled on a pinion shaft 42.

It is an advantage to use the cam shaft for the power take off because it is driven from the crankshaft, as indicated by the gear 44, and rotates at one-half the speed of the crankshaft. This slower speed is helpful in obtaining the desired speed reduction suitable for driving the rear wheels. However, it is to be understood that the illustrative embodiment of this controllable drive apparatus is well adapted for use with power taken off from the engine crankshaft, and where electric motors are used, with power taken from the motor shaft. In some mowers the engine 14 is offset on the chassis 12 from the rotor shaft 24 and suitable belt, chain, or gear transmission is used to couple them, in such case the power for the controllable wheel drive apparatus described herein is taken from either engine or rotor shaft or from a convenient point on the rotor drive power transmission.

To control the torque applied to the rear wheels, the pulley 38 is slidable axially up and down along the vertical pinion shaft 42. This pulley carries an annular clutch member 44 which engages a clutch disk member 46 which is rigidly secured by a hub sleeve 48 to a reduced end portion of the shaft 42. The shaft 42 is held at its upper end by a ball bearing assembly 50 whose inner race fits over a reduced end portion of the shaft. The outer race is cradled in a recess formed in the underside of a fixed clutch cover 52 rigidly secured to the chassis by a bracket 54, seen most clearly in Figure 6, bolted to the top of the rotor housing in a position generally behind the engine and between the rear wheels 18. To hold the lower end of this shaft a ball bearing assembly 56 is supported in a bracket 58 which is rigidly secured to the chassis and serves also as a lower protective shield for the clutch members 46 and 44 and for the pulley 38. The pulley has a depending cylindrical shell 60 which comes down around these clutch members to protect them further.

To transfer torque from the clutch member 46 to a wheel drive shaft 62 extending transversely of the carriage between the rear wheels a bevel gear 64 is fixed to the hub sleeve 48 and meshes with a bevel gear 66 secured to the shaft 62. At each end this shaft 62 is coupled through an over-riding clutch 68 (Figures 1 and 2) to spur gears 70 engaging annular gears 72 on the inner faces of the rims of the rear wheels. This over-riding clutch may desirably be of the shuttle-pin clutch type as shown and claimed in application Serial No. 571,064, filed March 12, 1956 and assigned to the same assignee as the present application.

Figure 3:
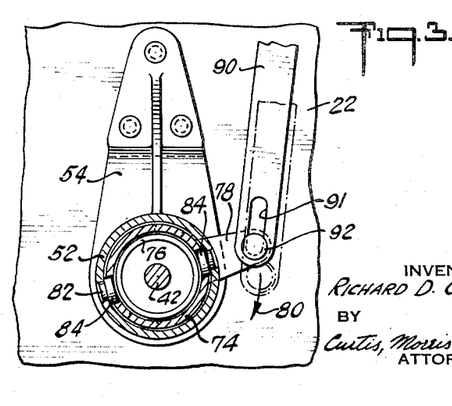
Figure 10:
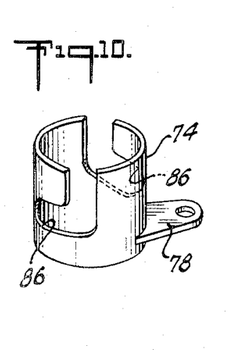
Figure 10 is a perspective view of a clutch control sleeve cam.

Within the clutch cover 52 is an annular cam control sleeve 74 which is biased in a clockwise direction as seen in Figures 2 and 3, by means of a relatively stiff helical torsion spring 76. That is, the spring 76 tends to turn the cam sleeve 74 so as to move a control arm 78 projecting from the sleeve near its lower edge in the direction of the arrow 80, from the position shown in full lines in Figure 3 toward the engaged position shown in dotted lines. To provide the desired force for engaging the clutch members 44 and 46, a pair of fixed stub shafts 82 project inwardly from opposite sides of the cover 52 and carry a pair of rollers 84 which engage in helically shaped annular cam slots 86 (see also Figure 10) in opposite sides of the cam sleeve 74. These cam slots 86 also include axially extending portions, as seen in Figure 10 to enable its assembly with the rollers 84 within the cover 52. The arm 78 projects out from the sleeve 74 below the lower edge of the cover 52 with sufficient clearance to enable the desired axial motion of the cam sleeve to occur.

As the cam sleeve 74 turns in the direction of the arrow 80, relative motion occurs between the rollers 84 and helical cam slots 86. This motion causes the cam sleeve to be moved downwardly from a disengaged position in which its top edge is closely adjacent the top of the cover 52, as indicated dotted in Figure 4, to an engaged position, in which the clutch member 44 is tightly pressed against the clutch disk 46. A ball bearing assembly 88 has its outer ring pressed up into a socket in the lower end of the cam sleeve 74 and has its inner ring pressed down over a reduced end of the hub of the pulley 38. This bearing assembly 88 allows the pulley 38 to rotate freely with respect to the cam sleeve 74 while transferring to the pulley 38 the downward thrust due to the rollers 84 acting on the cams 86.

Thus, the action of the spring 76 is to tend to hold the clutch members 44 and 46 tightly in engagement with each other and to hold the arm 78 in the direction 80, that is, toward the rear of the mower.

The annular clutch member 44 is formed of cork material engaging a metal disk 46. I find that the cork works to advantage in this clutch wherein the pressures are varied over a wide range to provide the desired range in driving torques which are applied to the wheels under different operating conditions and at different speeds.

In order to control the clutch arms 78 in response to motions of the handle 20, a link 90 has a horizontally flat portion with a slot 91 pivotally secured by a pin 92 to the end of this arm 78. The link 90 runs forward, having a twist, with a vertically flat forward portion pivotally pinned to the lower end of a clutch control lever 94, as seen most clearly in Figures 4 and 5. This lever 94 is pivoted at 96 to the upstanding end of a bracket 98 suitably rigidly secured to the chassis. The upper end of this lever is bifurcated and straddles a control bar 100 which extends across the chassis, as shown in Figure 1, and forms the pivot for the two lower ends 102 of the fork at the base of the handle 20.

Figure 6:
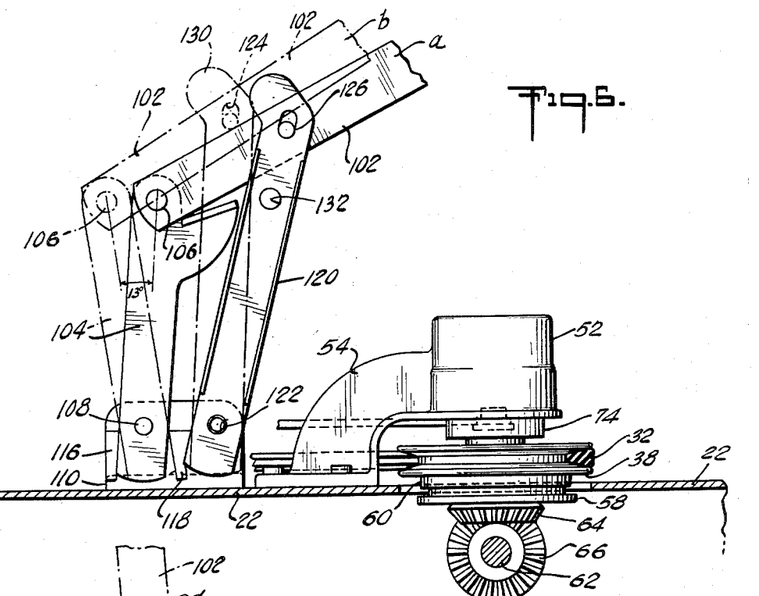
Figure 6 is a partial sectional view taken generally along the irregular line 6—6 in Figure 2 looking toward the right and showing the operation of parts of the handle control linkages.
Figures 7, 8, 9:
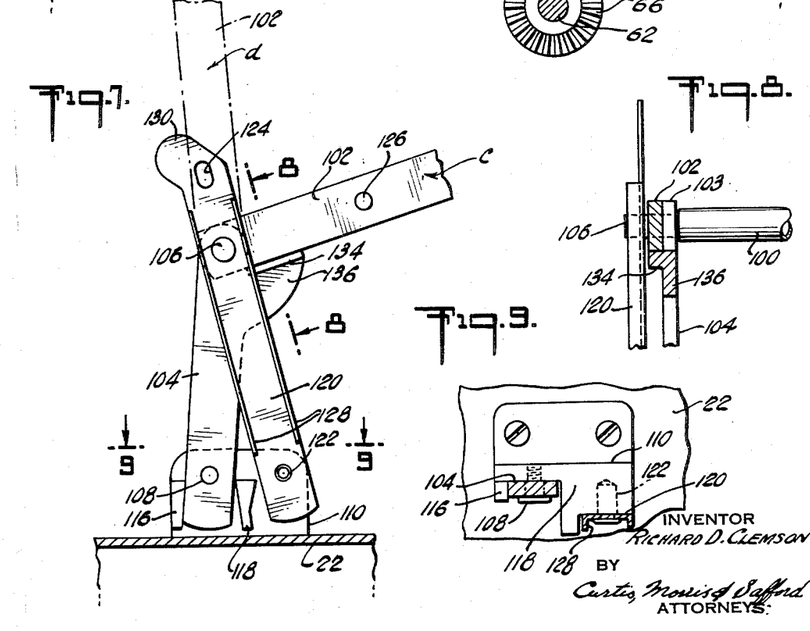
Figure 7 is a partial view corresponding to Figure 6 and showing the drive control and safety park positions of the handle control linkages.
Figure 8 is a partial sectional view taken along the diagonal line 8—8 of Figure 7 looking downwardly toward the left.
Figure 9 is a detail sectional view taken along the line 9—9 in Figure 7.

As shown most clearly in Figures 6, 7, and 8 the handle pivot control element 100 is pivotally fastened to upstanding ears 103 on a pair of generally R-shaped levers 104 by means of pivot pins 106 suitably secured in opposite ends of the control element 102 which is shown as being tubular. These pins 106 project out from the ends of the tubular element 100 through holes in the ears 103 and then through holes in the lower ends 102 of the handle fork. As shown in Figure 8 the ends of these pins 106 project out a slight distance beyond the fork ends 102 to provide detents enabling the operator to lock the handle in a safety neutral position when leaving the mower with the motor running, as explained in detail later. The lower ends of these levers 104 are fastened by pivots 108 and brackets 110 to the chassis.

Figures 4, 5:
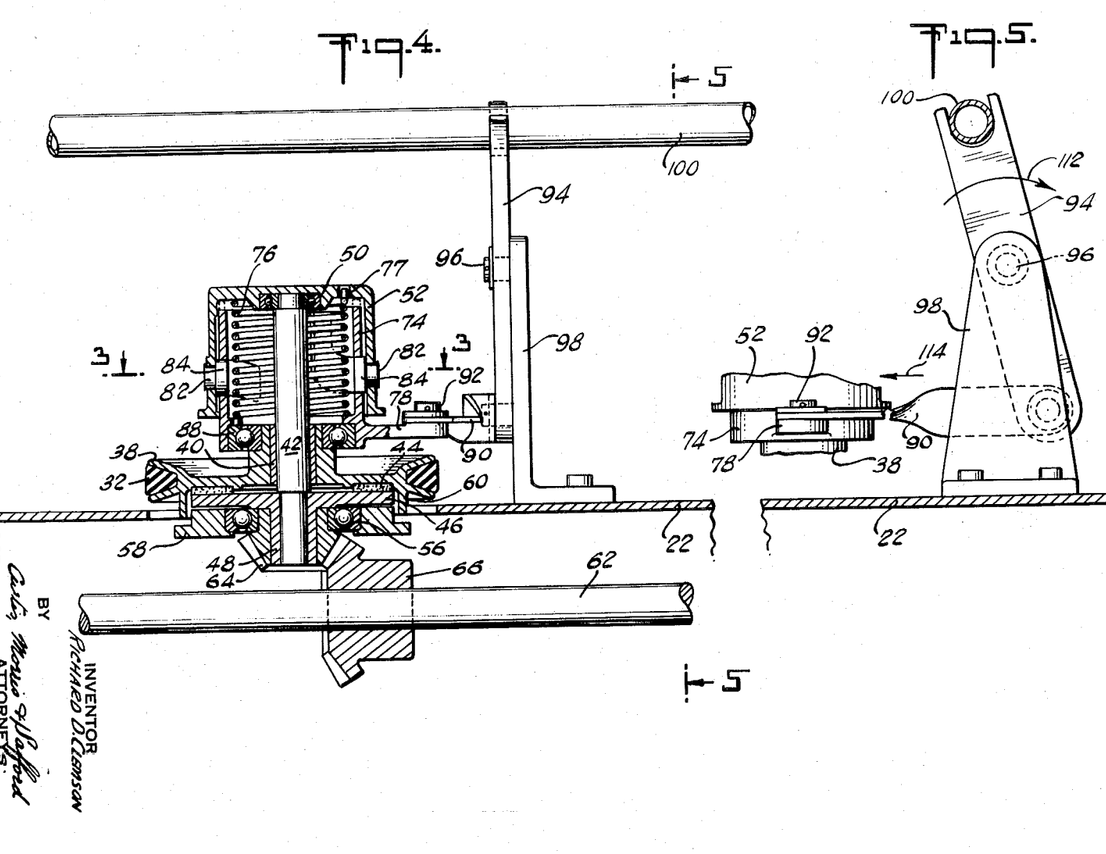
Figure 4 is an enlarged sectional view taken along the lines 4—4 in Figures 1 and 2 looking forwardly, that is, looking to the left in Figure 1 and looking toward the top of the page in Figure 2, and showing the controllable clutch and wheel drive shaft.
Figure 5 is an enlarged sectional view taken along the line 5—5 of Figure 4 looking toward the left, showing a portion of the control linkage.

Thus, as indicated by the dashed and dotted outlines in Figure 6, the handle fork 102 can be pushed forward by the operator from the position shown as "a" to the position "b." This moves the control pivot bar 100 (see also Figure 5) forwardly in the direction of the arrow 112, moving the link 90 back in the direction 114 toward full engagement of the clutch. In the position as shown in Figure 5, the clutch is fully disengaged. Pairs of stops 116 and 118 on the outside faces of the brackets 110 down near the top of the chassis housing 22 abut against the lower ends of the levers 104 and serve to limit the extent of the forward and backward motion of the control bar 100.

In order to provide a highly desirable automatic control action and to give a natural pleasing direction of control motion to the handle 20, a second lever 120 is secured to each of the brackets 110 by means of pivots 122. As shown in Figures 1 and 6, the levers 104 and 120 diverge toward their upper ends. The upper ends of these second levers 120 have longitudinal slots 124 and are pivotally connected to each of the handle forks 102 by means of stub pivot pins 126.

The levers 104 and 120 and the portions of the forks 102 between the pivots 106 and 126 form a three-bar linkage which controls the angle of the handle 20 and the slight change in this angle when the clutch is being engaged. In the illustrative embodiment of my invention the effective length of the lever 120 as measured between the pivots 122 and 126 is about ⅔ the effective length of the lever 104 as measured between the pivots 108 and 106. The spacing on the bracket 110 as seen in Figure 6 between the pivots 108 and 122 is about ⅓ the effective length of the lever 104. And the spacing between the pivots 106 and 126 as measured along the length of the handle fork 102 is about twice the spacing between the pivots 108 and 122, that is, ⅔ of the effective length of the lever 104.

When the handle is released by the operator, it tends to retract, that is, to move backwardly with respect to the chassis and to drop downwardly a very slight amount. Because of these advantageous ratios of lengths and relative pivot spacings, the lever 120 tends to swing rearwardly, and tends to cause the pivot control bar 106 to move back to the full line position "a" in Figure 6. Thus, the downward component of motion of the handle normally tends to disengage the clutch whenever the operator releases the handle and allows it to retract backwardly and to move downwardly slightly under its own weight. The clutch spring 76, which has its upper end held in a hole 77 in the clutch housing 52 and has its lower end held in a hole in the control cam 74 near the bearing 88 is relatively stiff. In biasing the clutch members toward engagement it desirably substantially opposes the tendency for the handle 20, when released, to retract back toward the rear position "a."

I prefer to arrange the spring stiffness and relative mechanical advantages of the levers 80 and 94 such that the torque of the spring acting to engage the clutch is just barely exceeded by the weight of the handle 20 in acting upon the levers 104 and 120. In this way, the unassisted weight of the handle 20 automatically disengages the clutch. Nevertheless, when the operator begins to move the handle forward from its retracted position, the spring 76 aids him and supplies the major share of the force necessary to move the handle the small distance forward toward initial engagement of the clutch. Thereafter, as the handle is moved forward somewhat further, the spring 76 causes the clutch members to engage even more tightly, so as to steadily increase the driving torque to the wheels. The mower speeds up and automatically matches its speed to the pace of the operator.

The slot 91 prevents the operator from engaging the clutch unduly hard. This slot provides room for a small amount of overtravel of the link 90. If the handle is vigorously pushed forward so that it reaches the position "b," none of the handle force reaches the clutch members, and the engagement force is provided solely by the spring 76. Thus, the spring 76 establishes the maximum clutch engagement force, and this maximum force is obtained when the handle is pushed substantially all the way forward to reach the stop 118. In intermediate positions the weight of the handle acting through the linkages as explained subtracts from this maximum force to provide a readily and sensitively controllable torque.

Whenever the operator starts to move forwardly faster than the mower, his hands advance the handle slightly, allowing the spring 76 to tighten the clutch and increase the driven speed. Whenever the operator slows down, the handle naturally retracts slightly and moves down a very slight increment, decreasing the driven speed. Any obstacle which causes the operator to hesitate or lift his hands from the handle automatically disengages the drive. An involuntary backward pull or retraction of the handle, such as occurs when the operator sees a stone just before hitting it, immediately and naturally disengages the drive. This is a tremendous advantage in giving the operator ease of mind and relaxed exercise in operating the mower and is a very desirable safety feature since its operation is instinctive.

Certain power drives now available on mowers require such complicated hand motions to disengage the clutch that the operator is continuously tense in operation. The only possible way to stop such mowers when an obstacle is seen at the last instant is to hold the mower back by brute force to provide time in which to disengage the clutch before hitting the obstacle.

In this illustrative embodiment, the stop 116 allows the lever 104 to swing back about 5° behind the vertical when the handle is released. In this position, the lever 120 is about 15° behind the vertical, and the handle 20 extends upwardly at an angle of about 26° to the horizontal.

When the handle is pushed all the way forward, the stop 118 holds the lever at about 8° ahead of the vertical, a total swing of about 13°. In this far forward position, the lever 120 swings up almost to the vertical, reaching a position just about 4° behind the vertical, representing a forward travel of this longer lever of about 11°.

Advantageously, the relationships and ratios set forth above cause the handle 20 to lift up slightly in being moved forward. In the far forward position the handle extends upwardly at an angle of about 31° to the horizontal, a rise of about 5°. This gives a very desirable action for the rise and fall of the handle in being moved forward and backward is only 5° while an effective 13° travel of the lever 104 is obtained.

By means of this effective three-bar linkage arrangement the handle 20 is mounted for motion longitudinally of the chassis. As shown, a component of the longitudinal motion of the handle is provided by translation, that is, with the handle shifting forwardly. Part of this longitudinal motion is provided by the handle pivoting about the transverse control bar 100 and swinging forwardly and upwardly. But, as pointed out, the lever 104 swings through almost three times as large an angle as does the handle.

As mentioned above, most of the force utilized in moving the handle forwardly is obtained from the clutch spring. In operation, the handle almost seems to float in the operator's hands. The slot 124 allows the chassis to swing slightly between climbing and descending altitudes while isolating this motion from the upper end of the handle. The slot 124 enables slightly more than 4° of free angular motion of the handle with respect to the frame. Thus, when the operator is forced to steer the mower over uneven ground any rocking motion of the mower caused by the ground does not produce corresponding motions of the handle. This slot 124 also provides a degree of up and down flexibility in handle motion to accommodate the operator's gait. Adding this 4° of free handle motion to the 5° of handle control motion, it is seen that the handle has a total angular travel of something more than 9° with respect to the mower frame when the levers 104 and 120 are in operating positions. When the operator gently supports the handle, it can be moved from its fully forward position back to its fully retracted position with less than 1° of angular motion, that is, the more than 4° of free angular motion is subtracted from the 5° of control motion, so that the handle height may conveniently remain substantially constant.

In order to latch the handle in a neutral safety position when the operator leaves the mower with the motor running, the levers 120 are formed of spring steel and are relatively thin (see Figure 9). They are stiffened by flanges 128, giving a channel shaped cross section over most of their length, except that a short portion down near the pivot 122 is free to be flexed. A thumb tab 130 is provided so that the lever 120 can conveniently be sprung out, enabling the slot 124 to free the pin 126, and a hole 132 is then latched onto the detent provided by the short projecting end of the pivot pin 106, as shown in Figures 7 and 8. When latched, the lever 104 is held back firmly against the stop 116, and the clutch is completely disengaged.

As shown in Figure 7, when the lever 104 is latched the handle fork 102 may rest down upon a ledge 134 (see Figure 8) formed by the turned over upper edge of a rearwardly projection tab 136 on the r-shaped levers 104. Among the many advantages of this arrangement is the fact that the mower may also be parked with the handle left vertical. This is quite handy when storing the mower neatly in a crowded garage or tool shed. As shown by the dashed and dotted lines in Figure 7, when the handle is parked vertically it is held in position by its lower ends' abutting against the forward edge of the ledge 134. The handle also may be parked vertically when the engine is running. When the lever 104 is latched back, the handle can be freely swung between the positions "c" and "d" shown in Figure 7.

Among the further advantages of my controllable drive apparatus is the ease with which the height of cut is adjusted. The front wheels 16 are adjusted in height by sliding tongues 138 projecting from the hub journals into slots at different heights in the forward projections 140 on the chassis housing 22. These tongues are locked in by vertical detent pins 142 which are readily extracted by hand from the top of the machine. This height of cut adjustment apparatus for the front wheels is disclosed in greater detail and claimed in a copending application Serial No. 506,050, filed on May 4, 1955, now Patent Number 2,857,725, having a common assignee herewith.

In order to enable ready adjustment of the height of the rear wheels 18, the stub shafts 150 on which the hubs of the rear wheels are journaled are each rigidly secured to a height adjustment lever 152. The front ends of these levers 152 are pivoted on the wheel drive shaft 62 just inside of the over-riding clutches 68. Suitable finger grips 154 are formed on the rear ends of these levers 152. Inwardly projecting latch detents 156 are adapted to engage in any one of a plurality of height adjustment detent sockets or holes 158 (Figure 1) in the sides of the chassis housing.

The highest hole 158 corresponds to a height of cut of 1 inch above the ground. Successively lower holes raise the rear end of the mower by ½ inch increments thus giving height adjustments of 1½, 2, 2½, 3, and 3½ inches. Each of these holes corresponds with one of the slots (not shown) into which the tongues 138 can be inserted.

For reasons of enhancing the cutting action of the rotor blade 26 as the mower is advanced, as explained in detail and claimed in the above-identified copending application Serial No. 504,406, there are advantages in orienting the plane of rotation of the cutting tips of the rotor blade at an inclination with respect to the ground plane, with this cutting plane elevated at the front by a slight amount in a range as claimed therein. The holes 158 are positioned with respect to the adjustment slots for the front wheels to give this slight elevation toward the front of the cutting plane of the rotor.

With this apparatus it is a very easy matter to raise and lower the rear wheels, by using the finger grip 154 to move the detents 156 into a different socket 158. Because the lever 152 pivots about the axis of the drive pinion 70, proper driving relationship with the annular internal gear 72 is advantageously maintained for all adjusted positions. It will be understood that different arrangements for adjusting the front wheels may be used, for this rear wheel height adjustment apparatus is readily adapted for use with a wide variety of front and rear wheel arrangements.

The dual over-riding clutches 68 are advantageous in enabling easy turning of the mower, with substantially all of the driving power still being supplied by the engine. In turning a corner the operator naturally eases up slightly on the small degree of forward push he has been exerting on the handle and turns the mower as desired. During a turn the handles swing out around a wider sweep than does the mower and thus the operator must take a few extra steps which naturally induces a retraction of the handle, advantageously slowing the mower driving action in going around a corner. The over-riding clutches cause the inside wheel to provide the thrust when turning and allow the outside wheel freely to turn faster. In this way a substantially constant walking speed is advantageously provided while the engine drives the mower around any corners.

In the improved mower shown in Figures 11–17 the controllable drive apparatus is similar in many respects to the apparatus described above. The differences and particular features of the controllable drive apparatus of Figures 11–17 are described hereinafter. Parts performing functions corresponding to those in the apparatus of Figures 1–10 have the corresponding reference numbers increased by 200, for example, the chassis frame is here shown as 212.

In order to provide motive power for the rear wheels 218, a V-belt 232 is driven by a drive pulley 234 on the cam shaft 236 of the engine 214. A belt guard 237 conveniently covers the belt 232 which runs back to the driven clutch pulley 238, and a wide flanged belt tensioning pulley 239 is housed under the guard 237. This tensioning pulley 239 is mounted on the knee of a pivoted lever 241 and is urged firmly against the outside of the belt 232 by a tension spring 243 stretched between the free end of the lever 241 and a lug 245 on the chassis frame 212.

The drive clutch is mounted between the rear wheels and operates identically with the clutch described above, except that it is mounted on the frame so that the clutch control arm and its control link pin 292 are positioned to the left of the clutch pinion shaft 242 as seen from the rear of the mower. This is opposite to the apparatus of Figures 1–10, because as is seen from Figure 5, the clutch control lever 94 reverses the direction of motion of the link 90 with respect to the motion of the handle yoke bar 100. Thus, when the handle moves forward, the clutch control arm 78 moves rearwardly to produce engagement of the clutch. In other words, the arm 78 rotates in a clockwise direction to produce clutch engagement.

Figure 11:
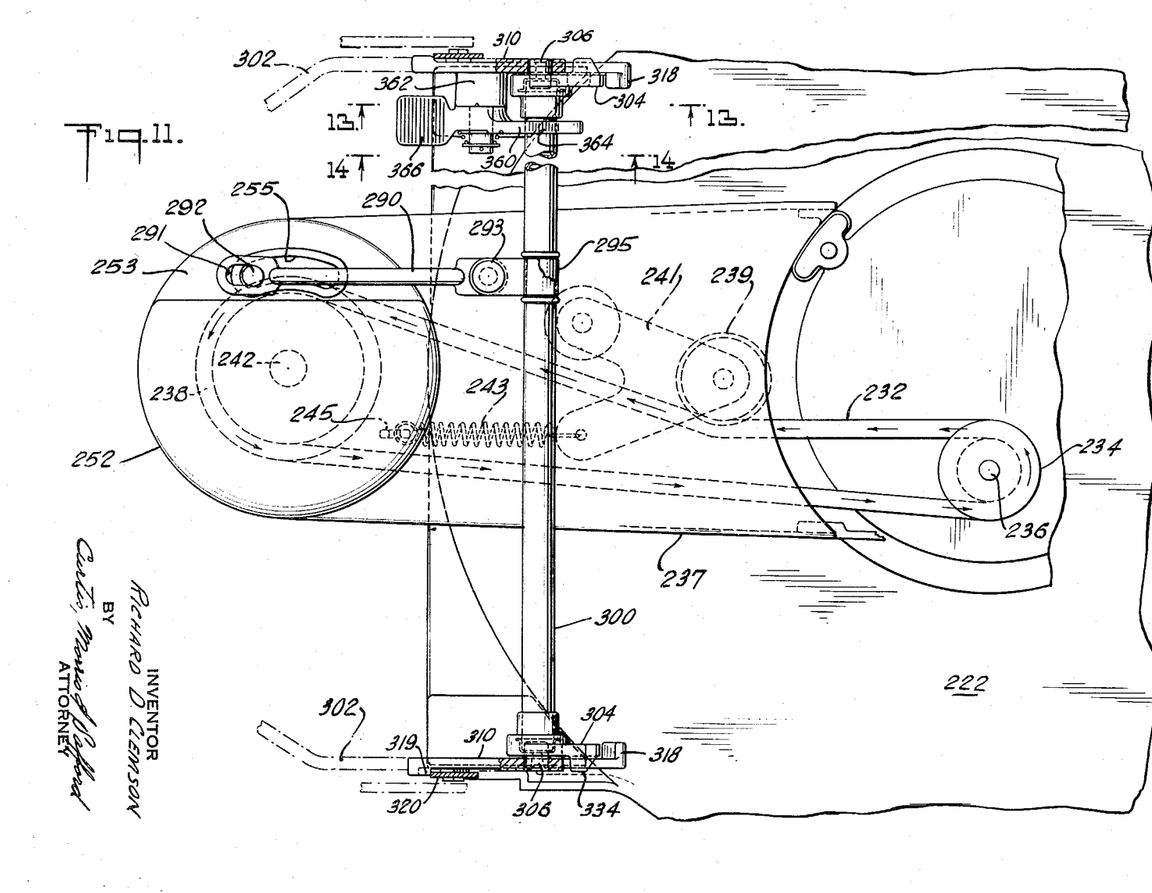
Figure 11 is a top view of the rear portion of a second illustrative embodiment of an improved rotary mower including controllable drive apparatus of the present invention.
Figure 12:
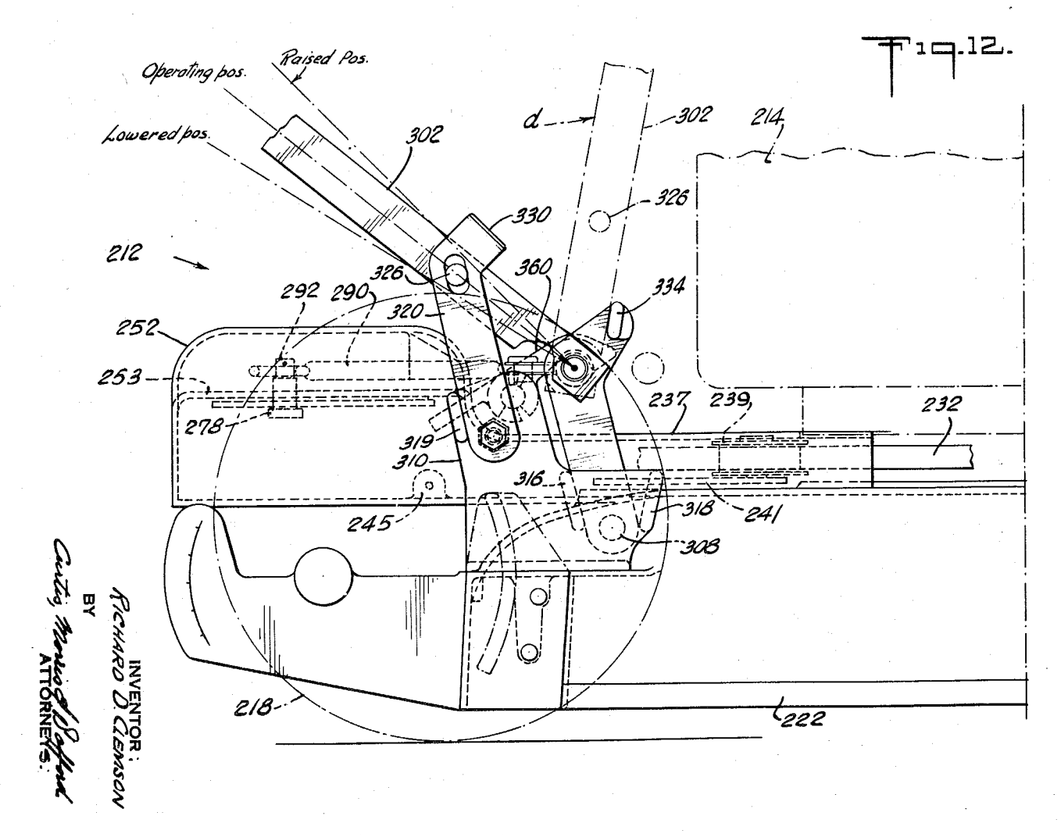
Figure 12 is an elevational view of the rear portion of the improved rotary mower of Figure 11.

As seen in Figures 11 and 12, the clutch control arm and its control link pin 292 also rotate in a clockwise direction about the clutch pinion shaft 242 to produce engagement of the clutch. For protection this clutch has a cover 252 advantageously formed integrally with the belt guard 237. As seen from the rear of the mower the clutch cover 252 has an offset portion 253 at the left and of reduced height so as to enclose the control arm 278 (Figure 12). The link pivot pin 292 at the end of the clutch control arm projects up through an arcuate slot 255 in the offset portion of the clutch cover. With this preferred arrangement of belt guard and clutch cover, the entire belt and clutch are protectively housed.

In order to control the clutch arm 278 in response to changes in the handle position, a link 290 has a horizontal flat portion with a longitudinal slot 291 fitted on the pin 292. This link extends forward and is secured by a bolt 293 to a strap 295 passing around a tie tube 300 forming a clutch control element and being spanned across in a position between the lower ends 302 of the handle fork. The axis of this tie tube is in alignment with the handle pivot studs as explained below. As the handle is moved, as explained below, by slight controlling hand pressures, the handle pivot control element 300 moves forward and rearward with respect to the mower frame. The helical spring within the clutch urges the clutch arm 278 in a clockwise direction, that is, forwardly toward engagement of the clutch. A very slight backward pull on the handle immediately reduces the clutch engagement pressure and slows down the mower. Advantageously, the control response is sensitive and accurately paces the mower's advance to the operator's walking speed.

Figure 13:
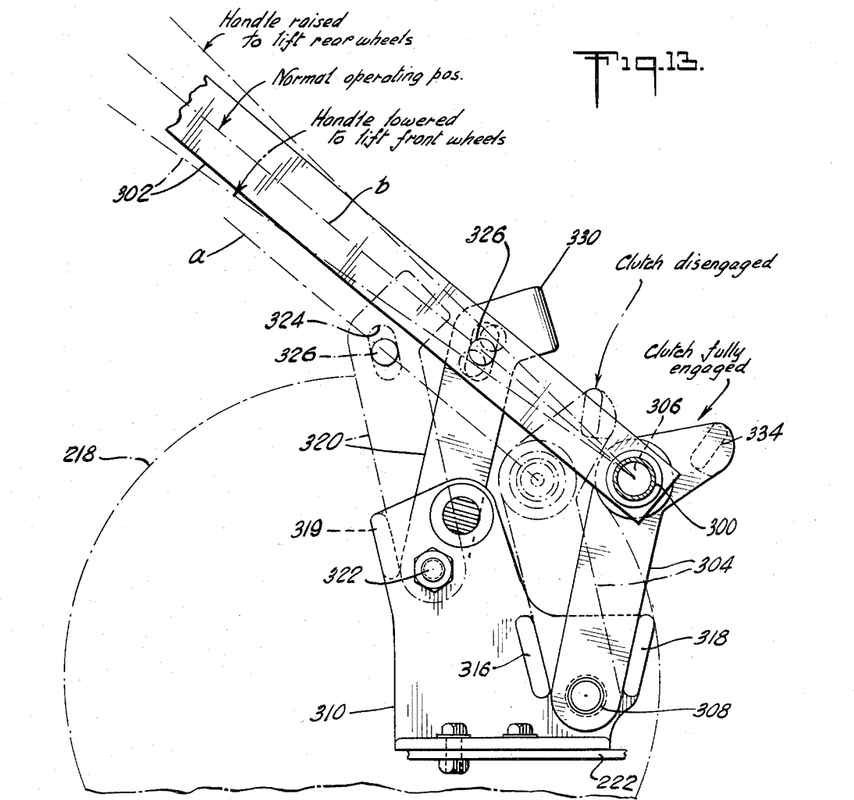
Figure 13 is a partial elevational sectional view on enlarged scale and taken along the line 13—13 of Figure 11 looking at portions of the control linkage mechanism and showing various operating relationships.

As is shown most clearly in Figures 11, 12, and 13, the opposite ends of this tie tube are secured to the upper ends of a pair of generally r-shaped levers 304, and studs 306 project out from these levers through holes in the lower ends of the handle fork to form the handle pivots. The lower ends of these levers are fastened by pivots 308 and brackets 310 to the frame.

A second pair of levers 320 are secured to each of the brackets 310 by means of pivots 322. The upper ends of these levers have longitudinal slots 324 which are pivotally connected to each of the handle forks 302 by means of stub pivot pins 326. Flat spring steel 1/16 of an inch thick is used to form these second levers 320, so that they may be sprung out to free the studs 326 and enable the handle conveniently to be swung up into the parked position "*d*" illustrated in Figure 12, as explained further below.

In operation the clutch spring normally urges the link 290 forwardly and tends to move the levers 304 and 320 into the forward or clutch fully engaged position shown in solid lines in Figure 13. The centerline of the handle then lies along the dot and dash line "*b*" in Figure 13. When the operator slows down the resulting slight retarding force exerted on the handle opposes the clutch spring, retracting the handle somewhat from position "*b*" and reducing the forward speed. To stop the mower at any time the operator easily and instinctively pulls back on the handle to completely disengage the clutch, moving the centerline of the handle back to position "*a*."

Pairs of stops 316 and 318 on the brackets 310 limit the motion of the lever 304. An additional stop 319 along the upper rear edge of the bracket engages the lever 320 when the handle is fully retracted. It also serves to support the levers 320 in a position to re-engage the handle when returning the mower to use after the handle has been in parked position.

The levers 304 and 320 and the portions of the lower ends 302 of the handle fork between the pivots 306 and 326 form a three-bar linkage which controls the angle of the handle so as to hold the handle at a substantially constant angle with respect to the horizontal as the handle is moved between retracted position "*a*" and the fully forward position "*b*." This also gives a natural pleasing direction of control motion to the handle, for the upper end of the handle remains at a constant height. In operation the handle almost seems to float in the operator's hands, while the power drive paces the mower to the operator's gait. The angle of the handle in the normal operating position as shown in Figures 12 and 13 is about 39° with respect to the horizontal. The slot 324 enables the handle to swing freely with respect to the mower frame also over an angle of slightly more than 9°. This freedom of movement thus accommodates changes in altitude of the mower chassis in running over rough terrain, while conveniently isolating any such motion from the upper end of the handle.

In this apparatus, as illustrated most clearly in Figure 13, the pivots 306 and 326 are spaced apart a distance equal to the spacing of the pivots 308 and 322, and a line through the pivots 308 and 322 is parallel to the normal operating position of the handle fork, that is, at an angle of about 39° to the horizontal. The effective length of the lever 304 equals the effective length of the lever 320, forming a parallelogram, and the spacing between the pivots 306 and 326, and 308 and 322 is approximately equal to the effective lengths of levers 304 and 320.

When the handle is fully retracted the levers 304 and 320 are both approximately 13° behind the vertical and when it is fully forward these levers 304 and 320 are approximately 13° ahead of the vertical, a total angular movement of about 26°.

In order to latch the handle in fully retracted position to hold the clutch drive in neutral when it is necessary to leave the mower with the engine running, a latch 360 is pivotally mounted on the reduced end of a boss 362. This boss is near the top of the bracket 310 at the left of the frame (see also Figures 14–17). The forward end 363 of this latch hooks downwardly, and it is adapted to latch over the handle pivot tie tube 300 when the handle is retracted. This forward end is serrated across its upper curved surface at 364, and the operator presses down on the latch at this point to swing it down into latching position.

Figures 14, 15, 16, 17:
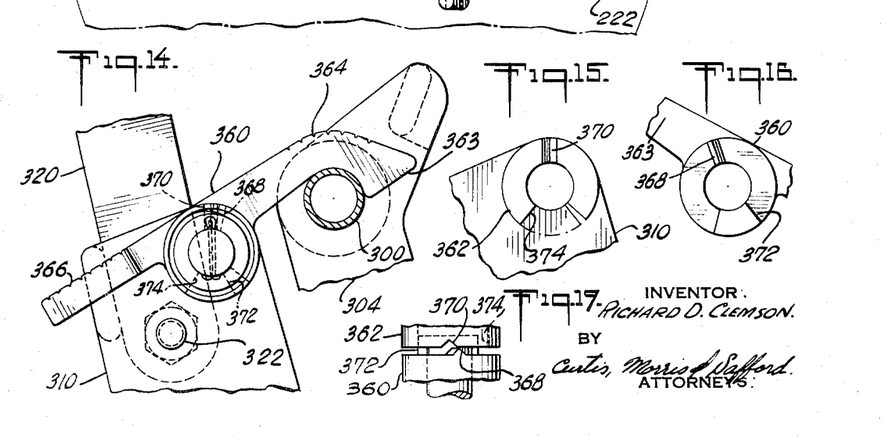
Figure 14 is a partial sectional view, on enlarged scale, showing the latching mechanism for latching the handle in its retracted or clutch disengaged position.
Figures 15, 16, and 17 illustrate certain details of the latching mechanism shown in Figure 14.

To unlatch the handle, the operator steps down on the serrated surface 366 at the rear end of the latch and swings the hook end up again. To hold the latch up when not in use, a radial triangular ridge forms a detent 368 as shown in Figures 16 and 17 on the side face of the latch hub near its pivot point. This detent engages in a radial triangular groove 370 (Figure 15) on the side face of the boss 362 adjacent the latch when the latch is raised. A short helical compression spring (see Figure 11) is mounted on the outer reduced end of the boss 362 and is retained by a washer and cotter pin so as to press the detent 368 firmly into the groove when the latch is swung up.

A stop for limiting the movement of the latch 360 includes a dog 372 on the latch hub and a larger co-operating recess 374 in the side face of the boss 362.

When it is desired to park the mower with the handle in a generally upright "parked" position, the operator latches the tie tube 300 and then presses out on the thumb tabs 330 (shown most clearly in Figure 13) at the upper end of the levers 320, springing them clear of the pivot pins 326. This enables the handle to be swung up to the parked position "*d*" 10° beyond top dead center, where it abuts against stops 334 on the forward ends of the r-shaped levers 304.

To obtain automatic engagement of the levers 320 and the pivot pins 326, I prefer to have the tabs 330 bent outwardly at about a 45° angle with respect to the plane of the levers 32. The stops 319 are arranged to support these levers in the full-line position shown in Figure 12 when the handle is "parked." Thus, whenever the operator wants to use the mower, he swings the handle down away from the stops 334, and the pivot pins 326 strike the inner faces of the outwardly bent tabs 330. The action cams the levers and springs them outwardly so that the pivot pins 326 drop right into alignment with the slots 324, and then the levers 320 spring back into operative position. This automatic alignment and engagement of the handle pivot pins 326 and the slots 324 is a marked convenience in operation.

Among the advantages of the controllable drive apparatus of Figures 11–17 are those resulting from the fact that a full 9° of free handle motion are obtained. In order to lift the front wheels, the operator lowers the handle until the pivot pin 326 hits the lower end of the slot 324. In this position the handle is at an angle of approximately 35° with respect to the horizontal. Depressing the handle more readily raises the front wheels, while at the same time the operator retains complete control of the speed of the clutch drive by easily controlling the degree of handle retraction when held in its depressed position to raise the front wheels.

To raise the rear wheels, the handle is lifted up to the top of the slots 324, placing the handle at an angle of somewhat more than 44° to the horizontal. Lifting the handle further readily raises the rear wheels.

Thus, a controllable amount of forward drive is conveniently obtained while the front or rear wheels are being raised. The entire control action is advantageously obtained from the handle and the complete steering and speed control of the mower can easily be done with one hand.

I presently prefer the embodiment of Figures 11–17 as enabling control of the driven speed while lifting the front or rear wheels which is desirable for residential use; however, the automatic disengagement of the drive whenever the handle is released in the embodiment of Figures 1–10 provides added safety which is particularly desirable in mowing public areas such as parks and playgrounds.

As used herein the expression that the handle is mounted for motion relative to the mower chassis in a longitudinal direction thereof is intended to include either or both motion of the handle forward and backward due to translation and/or motion of the handle forward and backward due to swinging of the handle about a pivot axis transverse to a vertical plane parallel to the longitudinal axis of the chassis.

From the foregoing it will be understood that the controllable drive apparatus of the present invention described above is well suited to provide the advantages set forth, and since many possible embodiments may be made of the various features of this invention and as the apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, or without departing from the scope of the invention.

What is claimed is:

1. Controllable drive apparatus for mowers comprising a chassis having a plurality of wheels, a source of motive power on said chassis, a controllable clutch on said chassis having a first rotatable clutch member, means driving said rotatable clutch member from said source of motive power, a second rotatable clutch member coupled to at least one of said wheels and adapted to be frictionally engaged with said first clutch member, spring means biasing said clutch members toward engagement, control mechanism adapted when moved in a first direction to actuate said clutch members into frictional engagement and when moved in a second direction to actuate said clutch members out of engagement, a guiding handle on said mower, a first lever having a first pair of pivots, one of said pivots connecting said first lever to the lower portion of the handle and the other pivot connecting said first lever to said chassis, a second lever having a second pair of pivots, one of said latter pivots connecting said second lever to the lower portion of the handle at a point spaced from the first lever and the other of the latter pivots connecting said second lever to said chassis at a point spaced from the first lever, said second lever being parallel to the first lever and forming a parallelogram with the lower portion of the handle and with the portion of the chassis between said levers, said handle being movable relatively longitudinally of said chassis, said control mechanism being moved in said first direction by forward motion of the handle and being moved in said second direction by rearward motion of the handle, the said forward motion of the handle being aided by said spring means, one of said levers having a longitudinal slot therein at the point of engagement with one of said levers enabling the upper portion of the handle to be swung in an arc up and down, whereby the handle controls the application of driving power through said clutch and the upper end of the handle is isolated from irregular motions of the mower chassis as caused by traversing rough ground.

2. Controllable drive apparatus for a rotary mower comprising a chassis having a plurality of wheels, a source of motive power on said chassis, a controllable clutch on said chassis having a first rotatable clutch member, means driving said rotatable clutch member from said source of motive power, a second rotatable clutch member adapted frictionally to engage said first clutch member, spring means biasing said clutch members toward frictional engagement, control mechanism actuable in a first condition to oppose said spring means and move said clutch members out of frictional engagement, a guiding handle on said mower, means movably securing said handle to said chassis for motion longitudinally of the chassis comprising a three-bar linkage in which the extreme links are pivotally connected to points spaced longitudinally of the chassis and the intermediate link is formed by a lower portion of the handle, stop means limiting the relative motion of said handle and allowing one of said extreme links to travel over a predetermined angular range, said control mechanism being actuated in said first condition by rearward motion of the handle in opposition to said spring means, said three-bar linkage producing a horizontal motion of said handle, a pivoted latch member adapted to latch the three-bar linkage with said one extreme link in its rearward position, the other of said extreme links being formed of resilient material and having an opening near one end, a pivot pin engaging said opening and forming a pivotal connection between said other extreme link and the lower end of the handle, said pivot pin being releasable from said opening by deflection of the resilient material, whereby the handle is released to be swung upwardly into parking position, a cam surface on said other extreme link for deflection thereof when the handle is returned to operating position, thereby reengaging said pivot pin in said opening.

3. Controllable drive apparatus for a rotary mower comprising a chassis having a plurality of wheels, a source of motive power on said chassis, a controllable clutch on said chassis having a first rotatable clutch member, means driving said rotatable clutch member from said source of motive power, a second rotatable clutch member adapted to engage said first clutch member and being coupled to at least one of said wheels, control mechanism adapted to move said clutch members into and out of frictional engagement, a guiding handle on said mower, means movably securing said handle to said carriage for movement longitudinally of the carriage including first and second levers having first and second pivots, respectively, connected to longitudinally spaced points on said chassis and having third and fourth pivots, respectively, connected to points spaced along the handle, said handle being connected to said clutch control mechanism for controlling engagement of the clutch in response to movement of the handle longitudinally of the chassis, said first lever being a resilient strip and having an elongated opening therein engaging said third pivot, whereby the upper end of the handle is isolated from erratic motion of the chassis as caused by uneven ground, said first lever being deflectable laterally to release the third pivot from said opening, and a thumb tab on said first lever for manual deflection thereof to release said third pivot and forming a cam surface for deflecting the lever for reengagement with the third pivot upon lowering the handle to its operating position.

4. Controllable drive apparatus for rotary mowers as claimed in claim 3 and wherein said first lever is generally upright and said second lever diverges upwardly from said first lever and is inclined toward the rear of the chassis.

References Cited in the file of this patent
UNITED STATES PATENTS

| | | |
|---|---|---|
| 1,008,309 | Cushman | Nov. 14, 1911 |
| 1,251,033 | Horniachek | Dec. 25, 1917 |
| 1,539,186 | Heller | May 26, 1925 |
| 2,116,739 | Eason | May 10, 1938 |
| 2,138,239 | Irgens | Nov. 29, 1938 |
| 2,255,347 | Brown | Sept. 9, 1941 |
| 2,457,210 | Coffey | Dec. 28, 1948 |
| 2,500,077 | Howard | Mar. 7, 1950 |
| 2,713,917 | Soenksen | July 26, 1955 |
| 2,818,699 | Clemson | Jan. 7, 1958 |